United States Patent [19]

Bailey

[11] 4,064,901

[45] Dec. 27, 1977

[54] GASOLINE SUPPLY ACCESSORY

[75] Inventor: David P. Bailey, Milton, Canada

[73] Assignee: The Raymond Lee Organization, Inc., New York, N.Y.

[21] Appl. No.: 729,123

[22] Filed: Oct. 4, 1976

[51] Int. Cl.² ............................................. B60R 27/00
[52] U.S. Cl. .............................. 137/351; 123/139 AV; 137/355
[58] Field of Search .................. 137/351, 355, 355.12, 137/355.16, 802; 251/289, 295; 123/139 AV; 180/114; 280/5 A

[56] References Cited

U.S. PATENT DOCUMENTS

| | | | |
|---|---|---|---|
| 1,492,447 | 4/1924 | Glover | 137/351 X |
| 2,543,564 | 2/1951 | Bakewell | 137/351 |
| 3,335,766 | 8/1967 | Winger | 137/355.12 |
| 3,834,484 | 8/1974 | Sangster | 180/114 |

Primary Examiner—Edgar W. Geoghegan
Attorney, Agent, or Firm—Howard I. Podell

[57] ABSTRACT

An accessory device attachable to a vehicle for pumping gasoline from the attached vehicle into a portable tank or into the gasoline tank of a disabled vehicle. The device includes a flexible hose permanently connected by a valve to the supply tube in the attached vehicle leading from the gasoline pump to the carburetor of the vehicle; together with a fixture mountable in the interior of fender of the attached vehicle about which the hose may be wound, when not in use. A valved outlet nozzle is mounted to the free end of the hose. The valve unit joining the hose to the vehicle supply tube is in the form of a tee connection with a rotatable valve cock that serves to connect the supply tube from the pump only to the carburetor tube or alternately to join the supply tube to both the carburetor tube and to the flexible hose.

4 Claims, 5 Drawing Figures

GASOLINE SUPPLY ACCESSORY

SUMMARY OF THE INVENTION

My invention is an accessory device attachable to a vehicle for pumping gasoline from the attached vehicle into a portable tank or into the gasoline tank of a disabled vehicle. The device includes a flexible hose permanently connected by a valve to the supply tube in the attached vehicle leading from the gasoline pump to the carburetor of the vehicle; together with a fixture mountable in the interior of fender of the attached vehicle about which the hose may be wound, when not in use. A valved outlet nozzle is mounted to the free end of the hose. The valve unit joining the hose to the vehicle supply tube is in the form of a tee connection with a rotatable valve cock that serves to connect the supply tube from the pump only to the carburetor tube or alternately to join the supply tube to both the carburetor tube and to the flexible hose.

By means of my invention, the driver of an equipped vehicle may readily stop his vehicle on a road adjacent to a disabled vehicle that is out of gasoline, and readily attach the output nozzle of his hose to the inlet of the gasoline tank of the disabled vehicle to supply it with gasoline. Alternately the device may be employed to fill a portable gasoline can for the supply of a boat motor tank or the tank of motorized lawn equipment.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
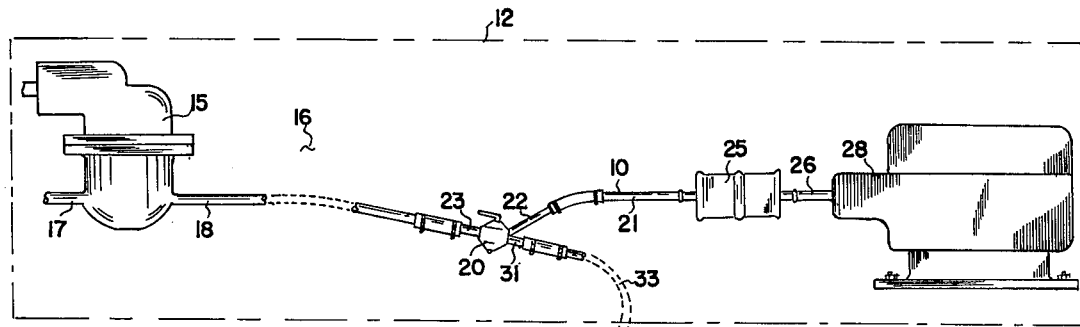
FIG. 1 is a perspective view of the invention installed.
Figure 2:
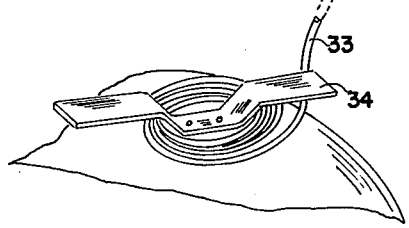
FIG. 2 is a plan view of the tee valve.

Turning now descriptively to the drawings, in which similar reference characters denote similar elements throughout the several views, FIG. 1 illustrates the accessory gasoline supply assembly 10 installed on a vehicle 12. A gasoline pump 15 mounted to the engine 16 of vehicle 12 is fitted with an inlet tube 17 leading from the gasoline tank (not shown) of vehicle 12 and an outlet tube 18 leading to inlet 23 tee valve 20. A tube 21 joins a first outlet 22 of tee valve 20 and leads to gasoline filter 25 connected by tube 26 to the inlet of a carburetor 28 in conventional manner. A second outlet 31 of tee valve 20 is connected to a flexible hose 33, which is wound about a bracket 34 fixed to an undersurface of a wheel fender of the vehicle 12. The free end 36 of hose 33 is fitted with a valve nozzle 38 as shown in FIG. 5, or alternately with an open nozzle for fitting into a portable gasoline tank (not shown) or into the inlet tube of the gasoline tank of another vehicle (not shown).

Tee valve 20 is fitted with a rotatable cylindrical plug 41 drilled with a through hole 42 which intersects a hole 43 oriented perpendicular to through hole 42 that extends to a surface of plug 41.

Figure 3:
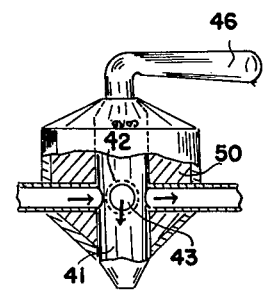
FIG. 3 is a sectional view of the tee valve, taken from line 3—3 of FIG. 2.
Figure 4:
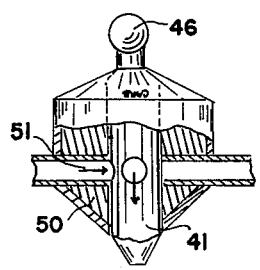
FIG. 4 is a sectional view of the tee valve.

A handle 46 is externally fixed to plug 41 to permit the user to manually rotate plug 41 to a first position, shown in FIG. 4, in which the holes 42 and 43 in plug 41 align with the ports 51 and 52 in the valve body 50 to conduct fuel from valve inlet 23 to valve outlet 22 respectively. When plug 41 is rotated to a second position, shown in FIG. 3, the valve inlet 23 is joined by plug holes 42 and 43 to both the carburetor valve outlet 22 and the hose outlet 31 of the valve to supply both the carburetor and the hose with gasoline.

Figure 5:
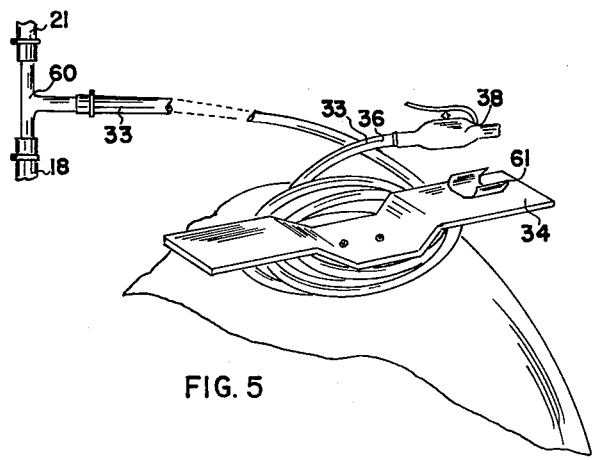
FIG. 5 is a detail perspective view of the invention.

As shown in FIG. 5, a tee 60 may be substituted for tee valve 20 with valve nozzle 38 controlling flow of gasoline from hose 33. Bracket 34 may be fitted with a clip 61 for detachably fastening about valve nozzle 38 when hose 33 is wound about bracket 34.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An accessory device adaptable for attachment to the gasoline supply system leading to the engine of a vehicle so as to serve as a source of gasoline to a tank exterior of the attached vehicle, consisting of
    a flexible hose fitted by a tee connector to the gasoline line in a vehicle, said tee connector mounted in the tubing of the vehicle joining the fuel pump to the carburetor, and
    valve means to regulate the flow of gasoline through said hose.

2. The combination as recited in claim 1 in which the valve means are mounted in the tee connector.

3. The combination as recited in claim 1 in which the valve means are mounted in a nozzle fitted to the free end of the hose.

4. The combination as recited in claim 1 together with a bracket mounted on the undersurface of a fender in a wheel well of the vehicle, said bracket of a size to retain a section of the hose wound about said bracket.

* * * * *